United States Patent
Kuntschar et al.

[11] Patent Number: 6,112,677
[45] Date of Patent: Sep. 5, 2000

[54] DOWN-DRAFT FIXED BED GASIFIER SYSTEM AND USE THEREOF

[75] Inventors: Walter Kuntschar, Wolfhagen-Ippinghausen; Werner Marzluf, Rheinstetten; Rudolf Porsch, Altbach; Arno Siegenthaler, Karlsruhe; Rainer Wennemar, Herzebrock, all of Germany

[73] Assignee: SEVAR Entsorgungsanlagen GmbH, Karlsruhe, Germany

[21] Appl. No.: 09/148,679

[22] Filed: Sep. 4, 1998

Related U.S. Application Data

[63] Continuation-in-part of application No. PCT/DE97/00428, Mar. 6, 1997.

[30] Foreign Application Priority Data

Mar. 7, 1996 [DE] Germany .............. 196 08 826

[51] Int. Cl.$^7$ ........................................... F23L 1/00
[52] U.S. Cl. .................. 110/315; 110/255; 110/259
[58] Field of Search .................... 110/229, 255, 110/256, 259, 315; 202/120, 221, 251, 252, 262; 201/5; 48/76

[56] References Cited

U.S. PATENT DOCUMENTS

| | | | |
|---|---|---|---|
| 4,929,254 | 5/1990 | Kooiman et al. | 48/76 |
| 5,401,166 | 3/1995 | Malleck et al. | 110/315 |

FOREIGN PATENT DOCUMENTS

| | | |
|---|---|---|
| 340637 | 4/1927 | Belgium . |
| 0 225 351 B1 | 6/1987 | European Pat. Off. . |
| 867425 | 10/1941 | France . |
| 897663 | 3/1945 | France . |
| 58258 | 10/1945 | France . |
| 425634 | 2/1926 | Germany . |
| 669 332 | 12/1938 | Germany . |
| 911419 | 4/1954 | Germany . |
| 35 18 323 A1 | 11/1986 | Germany . |
| 38 16 083 A1 | 11/1989 | Germany . |
| 40 13 761 A1 | 10/1991 | Germany . |
| 44 46 739 A1 | 6/1996 | Germany . |
| 225316 | 4/1943 | Switzerland . |
| 2 33 340 | 1/1991 | United Kingdom . |
| 2 296 493 | 3/1996 | United Kingdom . |

*Primary Examiner*—Noah P. Kamen
*Attorney, Agent, or Firm*—Chadbourne & Parke LLP

[57] ABSTRACT

A down-draft gasification reactor has a solids storage chamber bordered from below by a grate and having an oxidation zone, a product gas collection region disposed beneath the grate, a product gas line for discharging out-gassed product gas from the product gas collection region, a slag-separation device disposed above the grate, and a discharge mechanism downstream of the grate for transporting the separated slag out of the reactor.

63 Claims, 7 Drawing Sheets

DOWN-DRAFT FIXED BED GASIFIER SYSTEM AND USE THEREOF

This application is a continuation-in-part application of PCT application PCT/DE97/00428 filed Mar. 6, 1997 and which is still pending.

BACKGROUND OF THE INVENTION

The invention concerns a down-draft fixed bed gasifier system, also known as a direct current solid bed gasification reactor, for the gasification of organic solids having high ash content and tending to form slag, in particular of residual or refuse materials such as sewage sludge, wood or liquid manure, with a solids storage chamber for the reception of the solid bordered at its bottom by a grate and with a product gas line for discharging the outgased product gases, wherein the solids storage chamber has an oxidation zone having an air and/or oxygen inlet. The invention is also directed to advantageous applications of the gasification reactor, in particular for the disposal of sewage sludge.

The sewage sludge generated in community or industrial sewage processing installations during the purification of sewage water is, in dried form, a solid having high caloric content of approximately 10,000–14,000 kJ/kg. When the sewage sludge is dried it solidifies and forms so-called pellets. These pellets can be burned in a gasification reactor or roasted to thereby give off a weak gas having high energy content (product gas) which can be burned in a diesel motor. A generator connected to this diesel motor is used to produce electricity. The waste heat of the motor can be utilized to dry the sewage sludge.

In accordance with prior art, the combustion of sewage sludge is only useful from an economic point of view if the sewage installation has a size corresponding to 0.5 million or 1 million serviced residents. The investment and operation costs do not result in an acceptable cost efficiency in smaller installations.

The conventional gasification reactors known to date can only be operated in batch mode, since the slag formed by same cannot be effectively and evenly discharged out of the combustion chamber through the shaker grate or via other discharge mechanisms. This means that the reactor is loaded with a charge of pellets and operated until all pellets are carbonized. The gasification procedure must subsequently be terminated and the slag removed from the combustion chamber.

By way of example, the gasification installation of the company IMBERT Energy Technology is configured as a suction gas installation having a solid fuel container with a solid storage chamber which tapers in a downward direction and is bordered at its lower end by a grating. An air conduit leading from the side into the solid storage chamber facilitates the introduction of air into the oxidation zone of the solids storage chamber. This solids storage chamber is disposed within a cylindrical reactor container having an exhaust opening in its upper region for suctioning-off the product gas. The IMBERT gasification installation works as a suction gas installation. An underpressure is applied to the exhaust opening integrated in the upper region of the reactor to suction the product gas out of the solids storage container. The product gas is thereby suctioned through the grate out of the solids storage container and guided past the outer wall of the solids storage container into the upper region of the reactor before it leaves the reactor.

These types of gasification reactors, or wood gas installations, are normally used to gasify wood or wood-like materials. These types of installations can also be used to gasify other materials, in particular dried sewage sludge shaped into pellets.

In order to gasify the sewage sludge, the sewage sludge pellets are roasted sub-stochiometrically. This is effected at a temperature between 850° C. and 1100° C. or even up to 1400° C. The sewage sludge pellets form slag and a plurality of neighboring pellets combine into a large slag clump. This slag formation necessitates the emptying and cleaning of the gasification reactor in relatively short time intervals so that the gasification process must be interrupted. Each interruption has, however, the consequence that the gasification process must be renewed and the pellets must be brought up to operation temperature using externally input energy. For this reason, this type of gasification reactor has very low efficiency.

In addition, undesirable operation conditions occur in the heating up phase with regard to the gas quality from the materials initially roasting at low temperatures. An increased amount of tar and oil are present in the gas which deposit in the downstream conduits or can be improperly burned in the downstream motor to cause deposits.

Document DE-PS 425 634 discloses a flue gas generator operating in the counter current mode. This flue gas generator has a tapping blade in the vicinity of the decomposed slag for separating a portion of the slag which is subsequently transported out of the flue gas generator into a trolley or the like with the assistance of a pushing mechanism (push-out stamp).

This flue gas generator functions in accordance with the counter current principle. The device known in the art from document DE-PS 425634 cannot however be used for down-draft gasification since in down-draft gasification the product seats on a grating through which the gas is fed. The press-out stamp described above does not prevent residual slag from collecting in the intermediate grate spaces. This impedes processing and can lead to complete stoppage. The clogged grate can, as already described above, only be freed of the residual slag after termination of the gasification process so that this conventional device has the above described disadvantages with regard to economical use.

SUMMARY OF THE INVENTION

Departing therefrom it is the underlying purpose of the present invention to create a gasification reactor of the above mentioned kind which requires less external energy input to therefore have a higher efficiency, and advantageous combustion and gasification. In accordance with an additional aspect of the invention it should be possible to create a method and a device with which the incineration of sewage sludge, the formation of ash from sewage sludge, or the gasification thereof is enabled in an economically acceptable manner with installations servicing a number of residents less than 0.5 million, e.g. 50,000 residents or more.

This purpose in accordance with the first aspect of the invention is solved in accordance with the invention with a down-draft gasification reactor of the above mentioned kind by providing a solids storage chamber bordered from below by a grate and having an oxidation zone, a product gas collection region disposed beneath the grate, a product gas line for discharging out-gassed product gas from the product gas collection region, a slag-separation device disposed above the grate, and a discharge mechanism downstream of the grate for transporting the separated slag out of the reactor.

The present invention is based on the realization that the continuously working gasification reactor does not need to be constantly ignited and consequently achieves a higher efficiency with reduced amounts of external energy input.

A gasification reactor configured according to this technical teaching has the advantage that the gasification can be operated continuously. When a slag layer forms on the grate, the slag separation device is activated and separates the slag from the remaining fuel material (for example sewage sludge pellets). This separated slag is then removed from the gasification reactor by the discharge mechanism without having to interrupt gasification of the solids located in the solids storage chamber.

The creation of a continuously operating gasification reactor does away with the firing-up of the gasification reactor of prior art following emptying so that the gasification reactor requires a substantially less amount of external energy. The efficiency of the gasification reactor is thereby substantially increased.

In addition, the quasi-continuous discharge of the slag facilitates processing without interruptions to avoid disadvantageous operating states.

An additional advantageous special feature is the disposal of a ring duct surrounding the oxidation zone which is connected to the oxidation zone via a plurality of openings. The air and/or oxygen inlet has the peripheral ring duct which is connected to the oxidation zone via the plurality of openings. The air or oxygen introduced into the ring duct distributes itself approximately homogeneously within the ring duct and gains entrance through the openings into the oxidation zone. In this manner, a good and even air and/or oxygen input to the oxidation zone is guaranteed in downdraft processing as well as a continuous and economical gasification of the solids, in particular of sewage sludge pellets.

In a preferred improvement of the gasification reactor in accordance with the invention, the slag separation device is configured as a horizontally directed shut-off valve disposed approximately 5 to 50 cm above the grate. This shut-off valve is preferentially driven electrically and separates the slag layer from the remaining solids. At the same time, the shut-off valve keeps the glowing solids in the solids storage container whereas the separated slag layer is discharged.

The discharge is preferentially effected by the folding away of a removal flap disposed below the solids storage chamber. The grate is pivotable along with the removal flap so that the separated sludge can fall out of the solids storage chamber.

Carbonization of the solids, in particular of sewage sludge pellets, is a slow, approximately homogeneous process. During carbonization, the solids or pellets form clumps which are substantially closed, so that it is difficult to suction the outgased product gas through the slag layer. For this reason, upwardly projecting rods or pins are disposed on the upper side of the shut-off valve which fashion small ducts or interruptions in the slag located above the shut-off valve so that, after removal of the shut-off valve, a better ventilation of the slag layer is guaranteed.

In an additional preferred improvement, a product gas conduit is disposed below the grate above the free end of which a bell is disposed. This bell forces the product gas to change its flow direction. This effects separation of dust or impurity particles from the product gas flow due to their inertia, since these particles continue their downward motion whereas the gas is deflected beneath the bell. The deposited dust or impurity particles are discharged when the flap is opened so that no impurities can collect in the gas exhaust region.

In a preferred improvement, the bell together with the free end of the product gas conduit and the removal flap can be pivoted so that they do not impede discharge of the separated slag layer.

In a preferred embodiment of the gasification reactor in accordance with the invention, the solids storage chamber has a plurality of stacked oxidation zones. Each of the oxidation zones is preferentially connected to the air and/or oxygen intake via corresponding openings. This has the advantage that the solids simultaneously roast at a plurality of locations so that a more even temperature is present in the solids storage chamber. As a consequence thereof, the individual solid sludge pellets roast for a substantially longer period of time to thereby effect a more complete incineration. This more complete incineration causes more product gas out-gassing to further increase the product yield and the efficiency of the reactor.

In an additional preferred embodiment, a reduction zone is disposed downstream of the oxidation zone. The roasting solids do not receive any oxygen in this reduction zone so that the CO and methane desired in the product gas is formed at this location.

The gasification process can be influenced and controlled by the oxygen introduced into the oxidation zone either in the form of pure oxygen or in the form of surrounding air. For this reason, it is advantageous to provide each oxidation zone with an independent air and/or oxygen intake.

In a preferred embodiment, each oxidation zone also has an independent ring duct to guarantee a precise control and supply of the corresponding oxidation zone with oxygen.

In still another particularly preferred embodiment, an ignition device can be introduced in the vicinity of the oxidation zone to heat the solids up to ignition or roasting temperature. In particular, when firing-up the gasification reactor it is necessary to pre-warm and ignite the initially cold solid pellets. This ignition device can be an electrical hot gas generator, an oil burner or a gas burner. After the solids have been initially ignited and sufficient glow has formed inside the oxidation zone, no additional ignition energy is added. From this point on, the gasification process is controlled by the oxygen intake.

In a preferred embodiment, the ignition is effected through the same openings in the oxidation zone through which the air or the oxygen gain entrance in to the oxidation zone.

During the gasification process, it is possible that the temperature in one or a plurality of the oxidation zones sinks to such an extent that proper outgasing can no longer be achieved even if the oxygen intake is increased. In this case, the temperature in the oxidation zone can be increased by switching on the ignition device. It is thereby advantageous for each oxidation zone to be equipped with its own ignition device so that optimum control of the gasification process can be guaranteed in the individual oxidation zones.

A forced drive leads to improved control of the air and/or oxygen intake. Towards this end, a fan can be disposed at an air intake opening of the gasification reactor or a suction device can be introduced at the product gas conduit.

It is preferred when different oxidation zones are supplied with air and/or oxygen using differing independently operated fans.

In another preferred embodiment, the cross section of the oxidation zone is smaller than that of the neighboring zones. This has the advantage that the substantial slag formation in this region cannot attach to the wall of the solids storage chamber to thereby impede discharge.

The oxidation zones widen conically towards the neighboring zones to assure proper sinking of the solid pellets in a downward direction.

Since discharge of the slag does not require interruption of the gasification, the gasification reactor in accordance with the invention works continuously. This leads to an increased efficiency, since the avoidance of powering up phases requires substantially less external energy. The product gas resulting from gasification of the dried sewage sludge consists essentially of CO, $CH_4$, $H_2$ as well as small amounts of $C_2$ gases.

The energetic use of bio-materials, in particular the use of organic residual or refuse materials is becoming increasingly important since the use of such raw materials saves fossil fuel energy and effectively reduces $CO_2$ emissions. In addition, an increasing amount of residual refuse materials should be refined and used as high quality fuel. Another goal is to reduce the amount of residual materials to be disposed of.

Sewage sludge coming from community and industrial sewage purification installations are unavoidable waste materials which should be thermally or materially used. The material utilization is determined by legal requirements and by the current economic situation. The material use of sewage sludge cannot guarantee, over a medium term time period, a sufficiently reliable disposal situation, since use of the sludges cannot be reliably estimated due to acceptance problems and changes in pollution content. For this reason, there have been substantial efforts in developing suitable methods and devices to facilitate, with an environmentally and economically reasonable amount of effort, a thermal application for sewage sludge by which its energy content can be utilized and by means of which this waste product can be reduced to its residual ash remnants.

Within the context of the present invention one has surprisingly discovered that the extremely difficult requirements for an economically and environmentally sound use of biological organic fuels in particular remnant, disposed materials such as sewage sludge, wood or liquid manure can be satisfied if the fuels are used as solids in a gasification reactor in accordance with the invention without, as had been thought at this point in time, the associated installation being too large for wide spread use and broad application.

Clearly, the method in accordance with the invention and the device in accordance of the invention are not limited to small installations, rather can also advantageously be used in large installations. The invention achieves goals which those of average skill in the art have been attempting to achieve for a long period of time. In order to thereby achieve good results with regard to ecology and economic considerations as well as with regard to the constructive requirements, the following measures are preferred either individually or in combination.

In a particularly preferred feature of the method in accordance with the invention, the fuel, in particular sewage sludge is dried to a dried substance content of 80–99%, preferentially between 85 and 95% prior to gasification in a gasification reactor. An advantageous adjustment of the drying and gasification processes leads to advantageous results.

In accordance with another preferred feature, the fuel, in particular the sewage sludge is shaped into pieces having a defined geometrical form, preferentially in substantially similarly shaped pieces. The diameter of the particles or pieces is thereby advantageously of a grain size range between 5 to 30 mm. The solid portion of the fuel is therefore shaped into a structured material, for example a granulate, having a plurality of advantageous features. The pieces have large surfaces to facilitate the removal of water which e.g. is advantageous for subsequent heat drying. In addition, the migration path to the surface of the structured material for the moisture contained in the solid fraction is shortened which is likewise advantageous for enhanced drying. Moreover, the fuel, in particular sewage sludge, can be formed into a structure facilitating stacking into a heap or pile which is sufficiently stable in the gasification reactor. The production of as large a surface or porosity as possible inside the material for the intake of oxygen and an optimal gasification process can also be achieved in this manner.

It has turned out to be particularly advantageous within the framework of the invention when, for increasing the surface to volume ratio of the solid portion of the fuel, the fuel is shaped by a shaping device into pieces with which the ratio of the square root of the envelope surface area to the cube root of the volume is adjusted to values in excess of 1.0, and preferentially between 2.0 and 3.5.

The fuel can be advantageously shaped by means of a shaping device in a cylindrical mold to a sausage-, spaghetti- or noodle-shaped product. The diameter is preferentially between 6 and 15 mm and the length between 5 and 50 mm. The method in accordance with the invention is not limited to one special shape for the structured pieces, rather all types of shapes can be utilized with which the solid portion is structured in the required manner. Suitable shapes and possibilities for producing a large surface/volume ratio are published by R. Schilp in "Concerning the Technology of Paste Granulation" special issue Chemie-Ingenieur-Technik [Chemistry-Engineer-Technology] 5/1977, page 374.

Particularly advantageous for the application in accordance with the invention are pieces of sausage-shape whose diameter is larger than 5 mm, preferentially larger than 8 mm, and particularly preferentially larger than 10 mm. An advantageous shrinking of the pieces during the drying process subsequent to shaping leads to a reduction in their size and the diameter of the pieces also strongly decreases in the gasification reactor so that the dimensions given are advantageous in order to counteract formation of a thick mass during carbonization. The optimal diameter is between approximately 10 to 15 mm.

The larger the shaped pieces the more difficult it is for oxygen to enter into the core region of the pieces even given the subsequent shrinking in a water removal device or in a gasification reactor. In accordance with another advantageous feature, the diameter of the pieces, in particular of the sausage-shaped pieces, is less than 50 mm, preferentially less than 35 mm and particularly preferentially less than 20 mm.

The fuel is preferentially shaped into pieces of pasty consistency, since only low amounts of energy are required to shape the pieces and the mechanical requirements of the shaping device are low. The shaped pieces have sufficient stability for further processing. In accordance with an additional advantageous feature it is therefore proposed that the fuel, in particular sewage sludge, is dried prior to shaping into pieces using a water removal device to a dried substance content between 15 and 45%, preferentially between 20 and 35%. The dried substance content of the initial sewage sludge lies approximately between 3 and 6% and a conventional mechanical device is advantageous for the liquid removal. Initial water removal can e.g. be effected in a centrifuge, a screen belt press, a chamber filter press or the like.

A particularly preferred feature proposes that the fuel, in particular sewage sludge, be shaped in a shaping device having a transport screw, a conveyor belt, a chain trough conveyor or a bucket conveyor, with an acceptance device for a particular amount of the fuel transported by means of the transport screw, a die having perforation holes and a pressing member to press the preferentially pasty fuel through the perforation holes to form sausage-shaped pieces. Additional advantageous features and suitable shaping devices which are advantageous within the context of the invention are described in the documents EP 0225351 B1l, DE 4013761 C2 and DE 4446739 A1 the complete disclosure of which is hereby incorporated by reference.

As already mentioned, it is advantageous within the context of the invention when the fuel, particularly fuel formed into pieces by a shaping device, is dried by means of a water removal device. Such a water removal device can, in principle, use any conventional water removal process, in particular drying processes, whose end products have the required structure for gasification in the gasification reactor in accordance with the invention with which a stable heap can be formed and which is sufficiently loose and porous to assure adequate oxygen intake. In principle a drum drier or an extruder could be used.

It is particularly preferred within the framework of the invention to utilize a water removal device which is a drier having a drying device in which the fuel is dried with hot air. A drying conveyor having a conveyor belt device for transporting the fuel disposed thereon through the drying device is particularly preferred, wherein the conveyor belt device has perforation openings and a dry gas flow passes through the perforation openings and the fuel layer.

In accordance with an additional advantageous feature, the conveyor belt device is surrounded by a drying oven constituting the drying device and having a plurality of chambers in the longitudinal direction of the conveyor belt device in which drying air, in counter current flow, is alternately driven back and forth through the perforation openings of the conveyor belt device and the fuel layer.

No particular requirements must be made with regard to the drying temperature. In particular, it is not necessary that the drying be particularly gentle. The temperature of the drying air can thereby vary between the individual drying chambers. For example, the temperature in the first chamber can be larger than 150° C. and should not be greater than 150° C. in the last chamber.

The dwell time in the dryer, i.e. the drying time, is in practical cases, about 15–60 minutes. The pieces thereby shrink by approximately 5–20%. In special applications it can be advantageous with regard to processing or economical aspects, if the fuel is dried in such a fashion that the structured pieces have a hard dry crust on their outer surface surrounding a softer core of higher moisture content.

Additional advantageous features of suitable drying conveyors are described in documents EP 0225351 B1, DE 4013761 C2 and DE 4446739, the complete disclosure of which is hereby incorporated by reference. In order to achieve particularly advantageous results when gasifying the fuel in the gasification reactor, in particular for sewage sludge it is advantageous when the fuel can be gasified within the gasification reactor in the form of a granulate having an open pore porous structure. The granulate can be produced using a drying device, in particular a drying conveyor, which has the advantage of a homogeneous grain size as well as a particular structure for the granulate or dried good and can be particularly advantageously fed by means of pieces shaped by a shaping device. The combination of a shaping device and a drying conveyor to produce the granulate for the gasification reactor is thereby preferred. An additional advantageous feature is the gasification of the fuel in the form of a granulate in particular one having open pored porous structure which can be poured into the gasification reactor to assume a stable pile through which air can penetrate.

The porous structure of the granulate and the possibility of generating a dumped pile through which air can penetrate is advantageous for the gasification process. Heat can permeate through the bulk pile and into the grain shaped gasification product. The resulting product gas can escape out of the gasification product and the pile with little resistance. Dumping heights up to 4 m and preferentially between 1.0 and 2.5 m can be achieved, wherein the piled material and the granulate facilitate even and homogeneous flow penetration with little flow resistance. The specific weight of the granulate is relatively small so that the mechanical load of the pile and consequently the mechanical compression in the gasification reactor are low. The compression and the stratification of the piled material is then sufficiently small that the gasification process can be advantageously carried out.

In accordance with another advantageous feature, the fuel is dosed into the low temperature carbonization zone of the gasification reactor to form a pile of material which can be permeated by air. An additional advantageous feature can provide that the fuel is mechanically subdivided in a dispensing device of the gasification reactor. In this manner, the fuel in the dispensing device of the gasification reactor can be adapted to the mechanical devices in the gasification reactor to guarantee a gas-tight separation between the dispensing area and the low temperature carbonization region.

By tuning, in accordance with the invention, the shape and the drying of the fuel, an even homogeneous and intensive outgasing of the open-pore structured pile material and of the open-pore structured fuel can be achieved to facilitate a gasification and out-gassing of the material through into the core region. Due to the open-pore pile, ashes are produced in the oxidation zone of the gasification reactor having a loose slag or ash structure. In this fashion a relatively simple slag-separation device and a simple discharge mechanism can be provided in order to remove the slag from the gasification reactor continuously or batch-wise without having to stop operation. The product gas obtained in this fashion can be used to produce energy.

The use of residual or refuse materials in an ecologically and economically sound fashion is thereby facilitated. Disposal of a ton of sewage sludge using conventional methods costs about DM 500. With the method in accordance with the invention, a positive energy balance can be achieved and the high disposal costs avoided. The carbonized final product can be granular having odorless fingernail-size grains which do not contain any poisonous materials. This final product can e.g. be utilized as a filling material for highway and road construction.

Further advantages of the gasification reactor in accordance with the invention and its application can be derived from the description and the accompanying drawings. The above mentioned features and those to be further described below can be utilized in accordance with the invention individually or collectively in arbitrary combination. The embodiments mentioned are not to be considered exhaustive enumerations, rather have exemplary character. The invention is shown in the drawings and explained more closely with reference to embodiments.

DETAILED DESCRIPTION OF THE INVENTION

The individual figures of the drawings show the gasification reactor in accordance with the invention in a very schematic fashion so that its construction can be more easily seen. The advantageous applications of the gasification reactor and the drying conveyor are also schematically shown.

Figure 1:
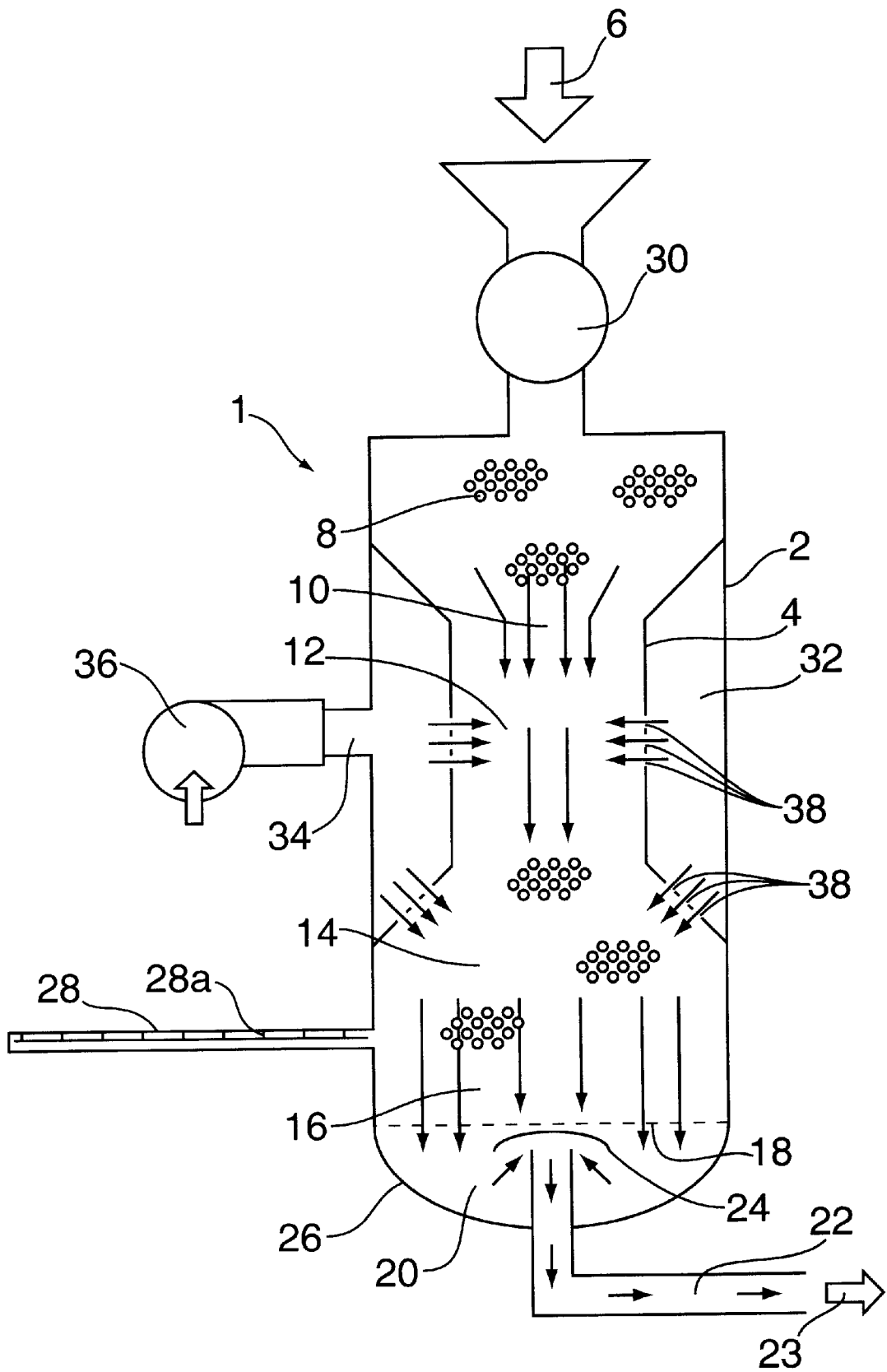
FIG. 1 shows a schematic representation of a gasification reactor in accordance with the invention.

FIG. 1 shows an embodiment of a gasification reactor 1 in accordance with the invention having a solids storage chamber 4 within a reactor housing 2 which can be supplied with energy-containing combustible solids via a fuel inlet 6. Sewage sludge is preferentially used for gasification. This is a waste product of most sewage processing plants. This sewage sludge has a high energy content but must be dried before it can be introduced into the gasification reactor. The sewage sludge is preferentially dried using the waste heat of the gasification reactor and/or of the diesel motor, driven by the product gas extracted from the sewage sludge. The dried sewage sludge is a granulate in the form of small clumps of approximately 1 to 5 cm in size (so-called pellets).

The solids storage chamber 4 is subdivided in layers into a plurality of zones, wherein a supply and drying zone 8 is disposed at the top followed by a low-temperature carbonization zone 10. An oxidation zone 12 is adjacent to the low-temperature carbonization zone 10 and maps continuously into a reduction zone 14. A slag zone 16 is at the lower portion of the solid storage chamber 4 and is bordered at its lower end by a grate 18.

A product gas collection region 20 is provided for below the grate 18 into which a product gas line 22 projects. A substantially convex bell 24 is disposed between one free end of the product gas line 22 and the grating 18. The opening of the bell 24 is directed towards the free end of the product gas line 22.

A reactor housing 2 having a removal flap 26 is mounted in a pivotable fashion below the solid storage chamber 4. The free end of the product gas line 22, the bell 24 and the grating 18 can be pivoted along with the removal flap 26 so that the bottom of the solid storage chamber 4 is opened when same are fully pivoted out (see FIG. 2). An electrically driven shut-off valve 28 disposed between the reduction zone 14 and the slag zone 16, can be displaced into the solids storage chamber 4.

Figure 2:
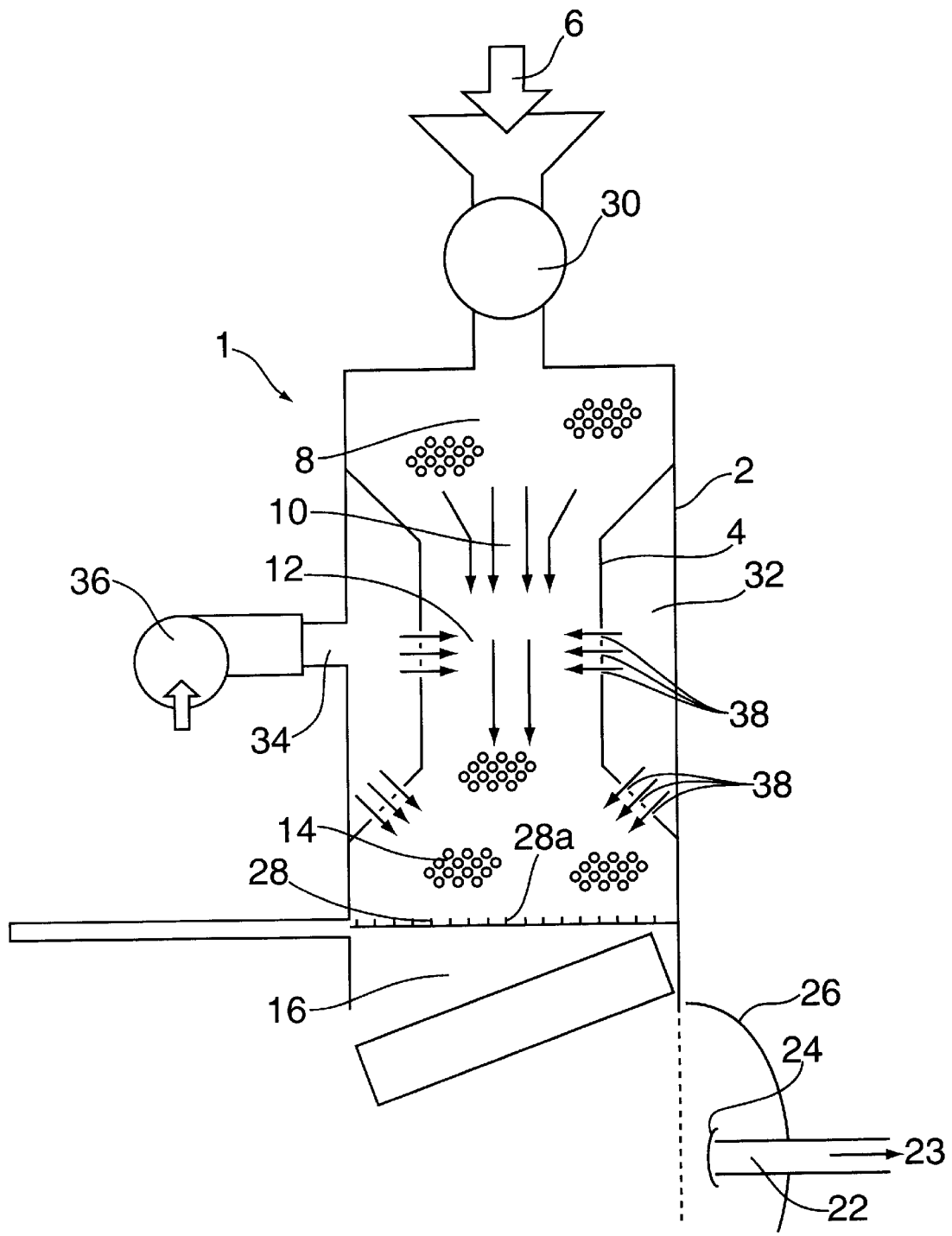
FIG. 2 shows the gasification reactor in accordance with FIG. 1 with an opened removal flap.

The gasification reactor 1 shown in FIGS. 1 and 2 is operated continuously after initial start-up. The slag which accumulates over time is separated from the remaining roasting solid pellets via the shut-off valve 28. The shut-off valve 28 can have upwardly projecting rods or pins 28a on the side facing away from grate 18. When the removal flap 26 is opened, the separated slag falls out of the gasification reactor 1 as shown in FIG. 2. This separation and removal of the slag is carried out in regular time intervals of approximately 10 to 15 minutes. The gasification process is however not interrupted and continues during separation and discharge of the slag.

The operation of a gasification reactor 1 in accordance with the invention is described below:

The empty solids storage container 4 is filled with dried sewage sludge after opening a supply lock 30. After the solids storage chamber 4 has received its desired charge, the supply lock 30 is closed so that the otherwise gas-tight gasification reactor 1 can be operated at under or overpressure (about 20 mbar). The solids storage chamber 4 is tapered in the vicinity of the oxidation zone 12 so that a ring duct 32 is formed between the solids storage chamber 4 and the reactor housing 2. An ignition device (not shown), e.g. a gas burner, is introduced into this ring duct 32, to heat up and ignite the sewage sludge pellets located in the solids storage chamber 4. Parallel thereto, air and/or pure oxygen is introduced into the ring duct 32 via an air intake opening 34 fashioned in the reactor housing 2 and with the assistance of a fan 36.

Openings 38 are provided for in the solids storage chamber 4 in the vicinity of the oxidation zone 12 through which the air or the oxygen can penetrate into the oxidation zone 12 in a homogeneous fashion to support combustion of the pellets.

After the pellets have ignited and an operation temperature of about 1400° C. has established itself in the solids storage chamber 4, the ignition device is switched off and removed. The reactions and out-gassing occurring in the pellets is subsequently controlled by increased or decreased introduction of air and/or oxygen.

During carbonization, the pellets shrink and form joined clumps of slag. These clumps of slag are separated from the remaining pellets forming the coals via the shut-off valve 28 which can be inserted into the solids storage chamber 4 parallel to the grating 11. When the grate 18, the removal flap 26, the bell 24 and the product gas line 24 are pivoted away, the solids storage chamber 4 opens and the clumps of slag fall out in a downward direction. After removal of the clumps of slag the grate 18, the removal flap 26, the bell 24 and the product gas line 22 are pivoted back to once more close the reactor housing in a gas-tight fashion. The shutoff valve 28 is then retracted so that the glowing pellets located in the solids storage chamber 4 slip through in a downward direction onto the grate 18. The free space produced in the storage and drying zone 8 of the solids storage chamber 4 is filled up with fresh pellets after opening the supply lock 30.

The coals located in the oxidation zone then warm the fresh pellets until these ignite. Normally, the glowing coals located in the oxidation zone are heated up through air and/or oxygen intake. In exceptional cases it can however be possible to pre-warm and ignite the subsequently added pellets by renewed introduction of the ignition device.

In another embodiment (not shown) the solids storage chamber is substantially larger and has a plurality of ring ducts and oxidation zones stacked above each other. In this fashion, the combustion of the pellets is even more intense leading to more out-gassing and to a better yield.

During normal operation of the gasification reactor 1, the newly occurring slag must be removed every 10–15 minutes. Towards this end, the removal flap 28 is only opened for about 10–20 seconds so that the gasification process itself does not thereby have to be interrupted.

Figure 3:
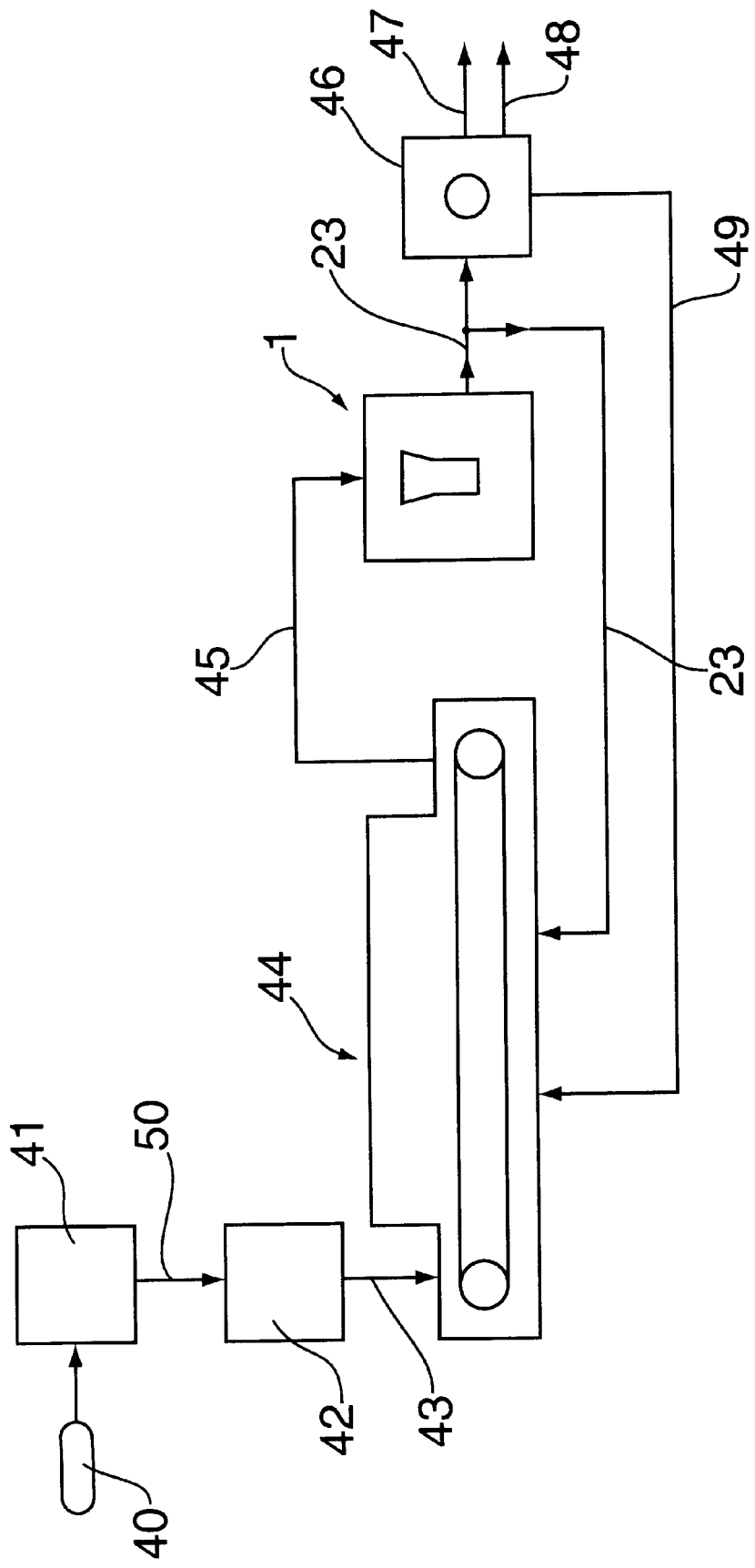
FIG. 3 shows a schematic representation of an installation for the carbonization of sewage sludge.

FIG. 3 shows a schematic flow diagram for an installation in accordance with the invention for gasification of sewage sludge 40. The moist sewage sludge 40 having a dry substance content between about 3–6% is dried in a water removal device 41 to a dried substance content of approximately 25%. The dried sewage sludge 50 is then structured in a shaping device 42 into sausage-shaped pieces 43 of approximately 12 mm diameter and approximately 30 to 100 mm in length.

The shaping device 42 comprises e.g. a die having perforated holes through which the sewage sludge 50 can be pressed via a pressing member. This type of shaping device 42 is described in documents EP 0225351 B1 and DE 4446739 A1. The formation of sausage-shaped extrusions in the shaping device 42 leads to an enlargement of the surface of the structured sewage sludge pieces 43 to facilitate introduction of heat necessary for drying and for improved removal of moisture from the material. A high specific drying capacity is thereby achieved. A particularly advantageous configuration of the shaping device 42 is described in FIG. 1 of document EP 0225351 B1.

The structured pieces 43 are transported via a drying conveyor 44. The conveyor belt has slotted holes which support ventilation of the pieces 43. The structured pieces are borne on the conveyor belt in such a fashion that they move as little as possible to minimize their mutual friction. In this manner, dust formation is avoided.

The drying zone of the drying conveyor 44 is subdivided into individual drying chambers in which hot drying gases flow through the material to be dried. The drying chambers are subdivided into a product region, in which drying air flows through the conveyor belt and the sewage sludge located thereon, as well as a circulation region in which heat energy is added to the drying air. A fan located in the circulation region circulates the air to generate the circulating air flow. If indirect heating is implemented, this location also has a heat exchanger to increase the temperature of the drying air.

The individual drying chambers are sealed with respect to each other in such a fashion that a mutual interaction of the circulating currents is avoided. Sideward openings in the drying chambers facilitate the introduction and removal of air needed to transport the vapors. The air is axially displaced in the drier in counter current flow with respect to the transport direction of the sewage sludge. In combination with the circulating air, a crossed counter flow thereby results. This crossed counter current flow causes the moist sewage sludge to be incident on already moist drying air. In this manner one prevents a closing of the pores of the granulate which would impede drying.

The drying of the sewage sludge is further intensified by the shrinking of the granulate and by the irregularities present in the sewage sludge which lead to a fir tree-shaped fanning out of the surface of the sewage sludge pieces. Further details of the drying conveyor 44 are described in connection with FIG. 4.

The dried pieces are removed from the conveyor belt at the output of the drying conveyor 44 and further transported by means of a transport device. The dried substance content is approximately 95%. The dried pieces and/or the granulate 45 are sufficiently loose and porous to allow a stable layered pile-up within the gasification reactor 1 for gasification.

A combustible product gas 23 is produced from dried sewage sludge in the gasification reactor 1 via high temperature gasification at temperatures of approximately 850° C. to 1000° C. through sub-stochiometric combustion (gasification). The product gas 23 can be used as a fuel for driving an internal combustion engine 46 to produce electrical energy 47 and/or thermal energy 48.

The fuel introduced into the gasification reactor 1 extends through same from above as a relatively stable dumping load at temperatures increasing in a downward direction up to the glow zone. Volatile substances begin to outgas from the material beginning at approximately 150° C. As the temperature increases, pyrolysis gases form which break up in the glow zone at temperatures of about 1000° C. and are partially burned. In the downstream reduction zone, the gaseous constituents react with each other and with the non-gasified carbon. This leads to the actual product gas 23 whose combustible main components are carbon monoxide, methane and hydrogen.

The high temperatures lead to a substantially oil and tar free product gas 23. Its caloric content is approximately 4000 kJ/m$^3$. The product gas 23 (combustion gas) is preferentially exhausted out of the gasification reactor 1 using a filter for dust removal. The slag occurring at higher temperatures is removed from the gasification reactor 1 in layers via a special discharge mechanism. The residual coal content of the slag can be less than 1% by weight.

The product gas 23 of the gasification reactor 1 can be advantageously utilized to dry the fuel for the gasification reactor 1 in the drying conveyor 44 where it is burned to generate heat. The thermal energy 48 of the internal combustion engine 46 or the waste heat 49 of the motor, of the motor cooling water, or of exhaust can advantageously be introduced to the drying conveyor 44 for drying purposes.

The internal combustion engine 46 is preferentially a gas diesel motor, i.e. a double material burner for gas or diesel operation. This has advantages for continuous power or electrical production. The product gas 23 can be suctioned by means of a gas cooler, compressed and ignited via injected diesel or heating oil in a fraction of e.g. 10 to 20%. Use of the pilot injection technique thereby facilitates the reliable ignition and good homogeneous combustion of the product gas 23. In addition, fluctuations in the heat capacities or the product gas are evened out. The internal combustion engine 46 is preferentially disposed in a compact, easily removable sound and heat absorption cover along with the attached synchronous generator as well as the heat exchangers for the motor cooling water and the exhaust. The radiative heat can then be discharged using a pressurized air unit. The motor cooling water and exhaust heat are transferred to a heating circuit and used for drying the sewage sludge. The combustion engine exhaust gas can also be catalytically cleaned.

The exemplary installation shown has a number of ecological and economic advantages for the gasification of sewage sludge. The energy containing sewage sludge, which is available free of charge and would otherwise only be disposable at significant expense is used to produce both electricity and heat. The carbon dioxide load on the environment is thereby reduced, since the sewage sludge is regenerated. The produced electrical energy 47 can be used to cover the basic electrical requirements of the sewage processing installation as well as completely cover the individual requirements of the drying and gasification installation. The drying of the sewage sludge prior to gasification can be effected substantially or even exclusively using its own energy content so that little or no additional energy is required. The sewage sludge 40 is reduced to a residual ash content which can e.g. be used in road construction or in the construction material industrial sector.

The overall process for thermal use of sewage sludge 40 has a positive energy balance. By way of example, an installation in which 50 to 100 kg/h of dried sewage sludge are gasified in a gasification reactor 1 requires approximately 150 kW of thermal and 10 kW of electrical energy to remove water from and dry the sewage sludge 40. The waste product from this processing is a filtrate or a condensate. The gasification reactor 1 produces approximately 80 kW of thermal power from the sewage sludge and, except for the residual ash, a product gas 26 which can produce 120 kW of thermal power and 60 kW of electrical power in an internal combustion engine 46.

Particularly advantageous results are achieved when the shaping device 42 and the water removal device (the drying conveyor 44) are adapted to produce a granulate 45 which can be advantageously gasified in the gasification reactor 1. Towards this end, the shaping devices 42 and the drying conveyor 44 described in the documents EP 0225351 B1 and DE 4013761 C2 have been particularly advantageous especially for appropriate sizes of the shaped pieces 43. Shaping increases surface area of the pieces 43 and facilitates a high specific drying efficiency.

Figure 4:
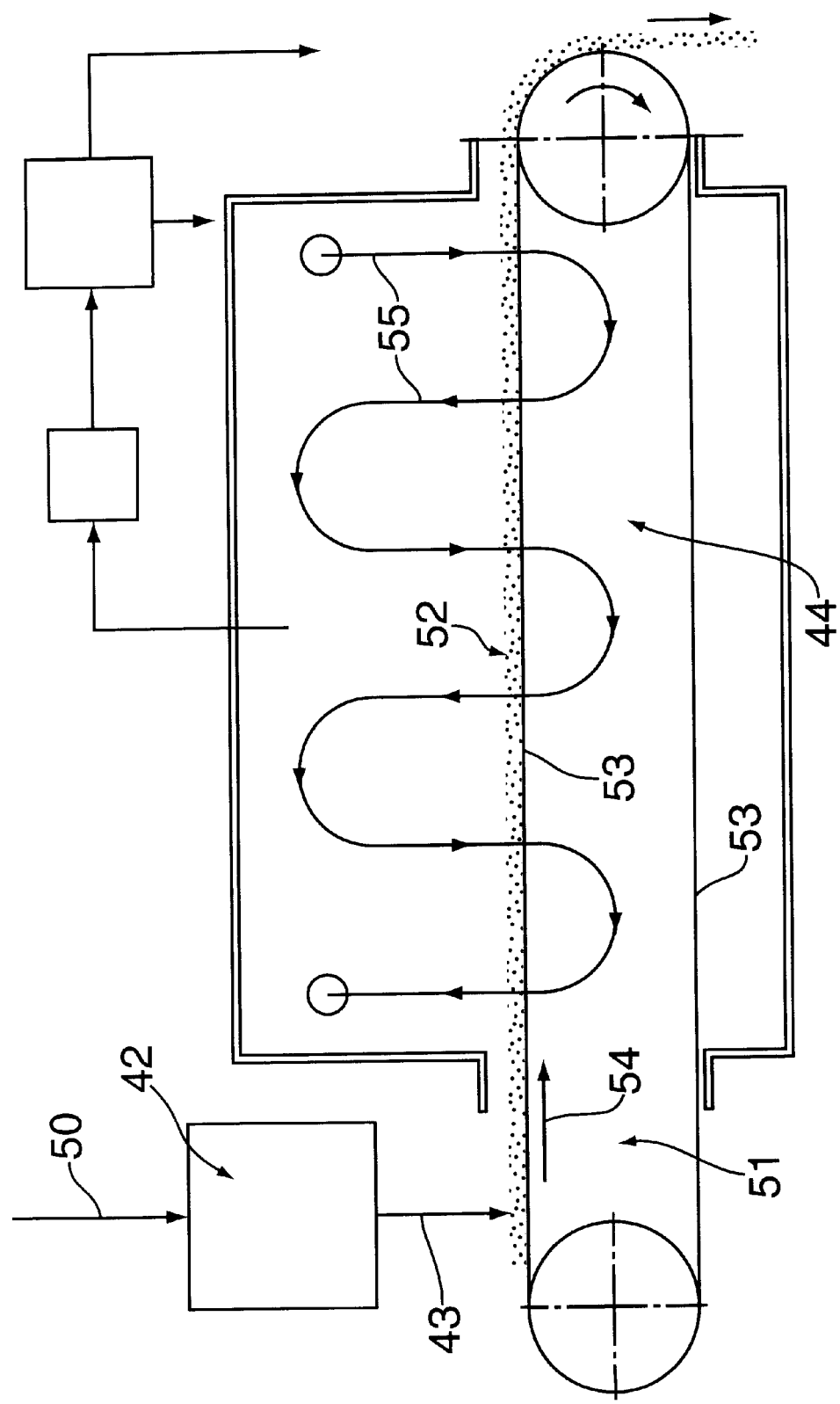
FIG. 4 shows a drying conveyor of FIG. 3.

FIG. 4 describes such a drying conveyor 44 in more details. The pre-dried sewage sludge 50 is introduced to the shaping device 42. The shaped pieces 43 are passed to the transport device 51 which is a conveyor belt device. The sausage-shaped chunks or otherwise formed pieces 43 are disposed in a gas-permeable, layered drying pile 53. The transport device 51 or the continuous loop 53 is air-permeable and is transported at transport velocity 54 through the drying conveyor 44. The permeable pile of drying material 52 consisting of pieces 43 which are to be dried is thereby passed through the dryer. A drying gas flow 55 is thereby passed alternately through the permeable continuous loop 53 and the drying material 52 and vice versa, wherein the drying gas flow 55 is deflected in counter current flow with respect to the transport velocity 54 of approximately 0.2 to 0.4 m/min.

The drying zone is subdivided into individual drying chambers. In each drying chamber, hot drying gases 55 flow through the drying material 52. Shrinkage of the pieces 43 and inhomogeneities within the sewage sludge lead to an advantageous fir tree-like fanning out of the surface.

The heating and ventilation can be carried out in a plurality of different ways. With direct or indirect heating, the air flow can be circulated to minimize exhaust load. In this manner, only a small fraction of the air is exhausted into the surrounding environment subsequent to drying via a bio-washer or a bio-filter. An indirect heating is particularly advantageous when external energy is available e.g. in the form of steam or thermal oil.

Further details are described in the above mentioned references. A drying conveyor 44 of this kind can increase the surface area of the sewage sludge to intensify water evaporation and lower maintenance costs due to its simple construction having slowly moving components. A small amount of exhaust is produced and less energy needed due to internal heat recycling.

Figure 5:
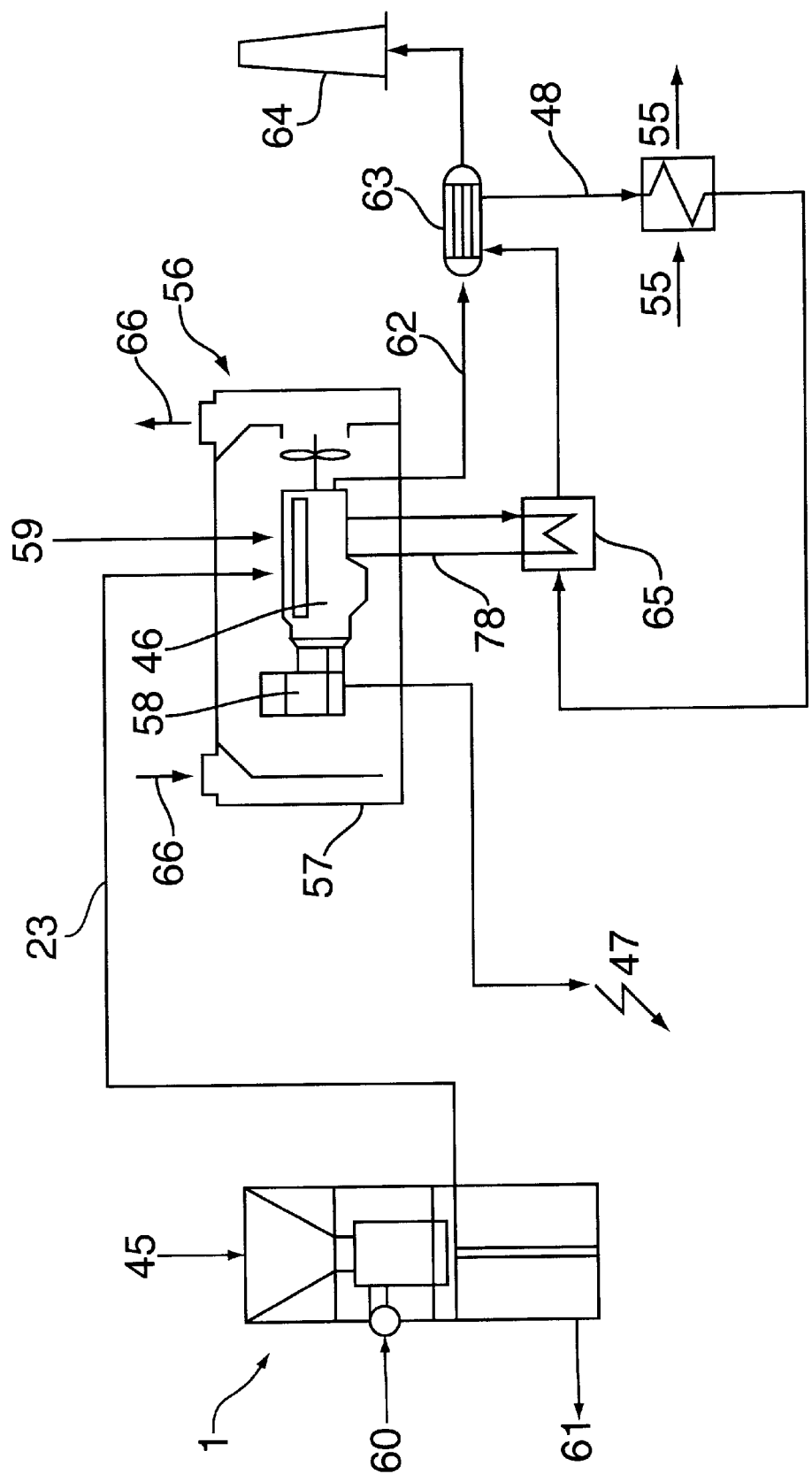
FIG. 5 shows a block heating and power station having a gasification reactor.

FIGS. 5 though 7 illustrate advantageous possibilities for incorporating a gasification reactor 1 in accordance with the invention in a module of a block heating and power station 56 for the production of heat and power. The block heating and power station 56 comprises an internal combustion engine 46 within a sound absorbing cover 57 and produces electrical energy 47 via a connected generator 58. The electrical energy 47 can either be fed to the power network or be used to directly drive an electric motor. The internal combustion engine 46 is a gas engine or a gas-diesel engine which can be supplied with combustion oil 59. The inside of the sound absorbing cover 57 is cooled with cooling air 66.

The internal combustion engine 46 can be driven by product gas 23 of a gasification reactor 1 or, alternatively, by natural gas. The gasification reactor 1 is supplied with a suitable fuel, in particular a granulate 45 of dried sewage sludge. It has a gasification air intake 60 and produces ash and/or slag 61 in addition to the product gas 23.

The waste heat of the internal combustion engine 46 can be used in various ways. The exhaust gas 62 is introduced to an exhaust gas heat exchanger 63 in which waste heat is extracted from the exhaust gas and the exhaust gas is subsequently discharged via an exhaust gas chimney 64 or an exhaust system. Thermal energy 48 is extracted by means of the exhaust gas heat exchanger 63 which, for example, can be utilized for heating purposes or for warming the drying gas flow 55 of a water removal device, in particular a drying conveyor 44. The thermal energy 48 can be in liquid or gaseous form. The return of this circuit can be pre-warmed via a cooling water heat exchanger 65 using the cooling water 78 of the internal combustion engine 46.

Figure 6:
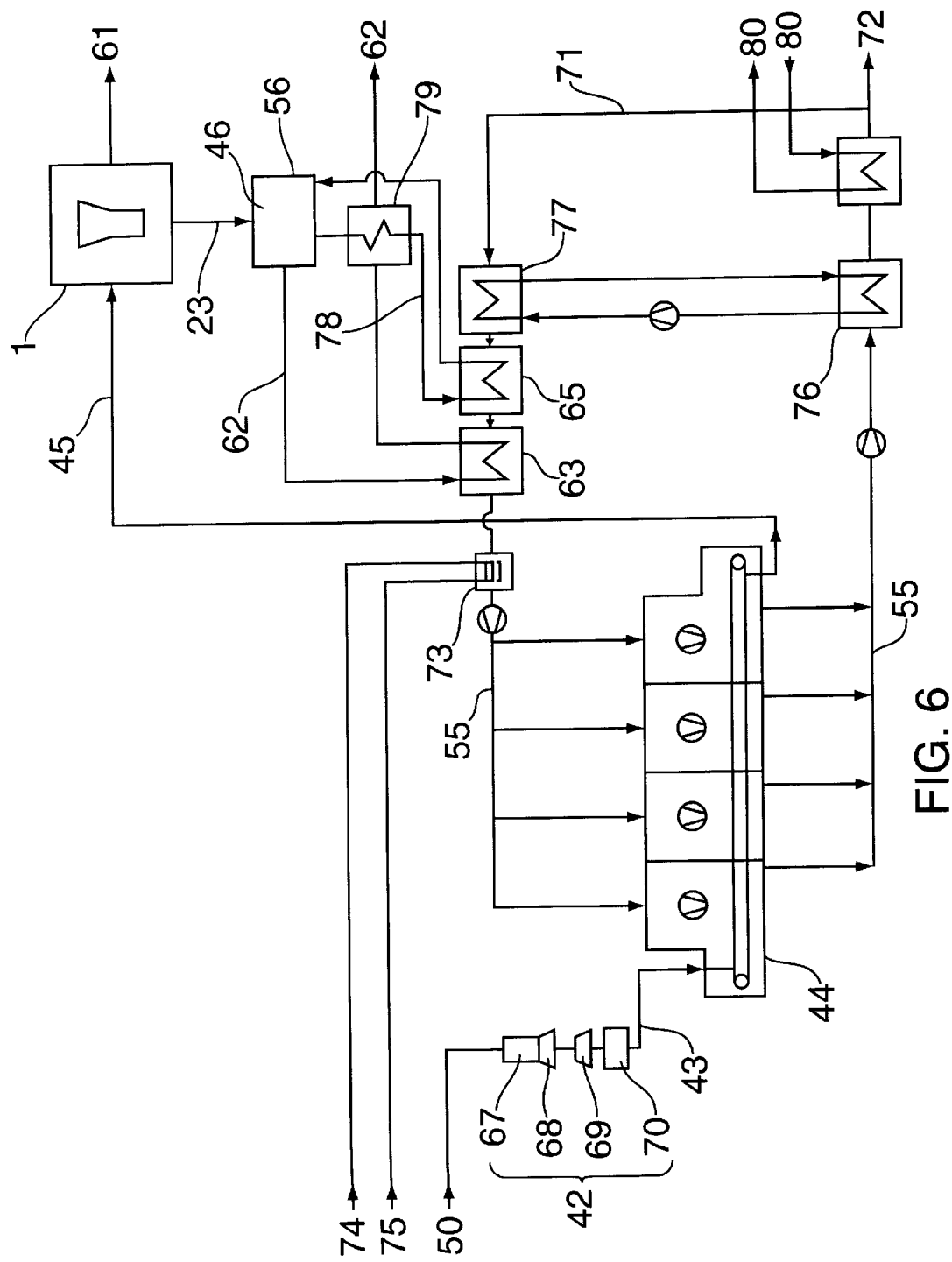
FIG. 6 shows details concerning FIG. 5.

FIG. 6 shows incorporation of a drying conveyor 44 into the operation of a block heating and power station 56. Sewage sludge 50 from which water has been removed is shaped into pieces 43 using a shaping device 42 comprising a first distributor 67, a dosing member 68, a second distributor 69 and die clamps 70. The pieces 43 are then introduced into the drying conveyor 44 and dried therein. The drying conveyor 44 has a plurality of drying chambers which, in the example shown, can each be flown through in a common direction from above towards below by means of a drying gas flow 55. The dried granulate 45 is gasified in a gasification reactor 1 to produce slag 61 and product gas 23. An internal combustion engine 46 of the block heating and power station 56 is supplied with the product gas 23.

The drying gas flow 55 of the drying conveyor 44 is circulated as circulating air 71 with a small portion given-off as exhaust air 72. The drying gas flow 55 can, if required, be heated via a burner 73, supplied with a fossil fuel 74, e.g. oil, gas or fermentation gas as well as with combustion air 75. One or a plurality of the heat exchangers described below can be provided to recapture the heat.

A first heat exchanger 76, 77 serves to heat the drying gas flow 55 using thermal energy recaptured from the drying gas flow 55. A second heat exchanger 65 warms the drying gas flow 55 using thermal energy recaptured from the motor cooling water 78 of the internal combustion engine 46. A third heat exchanger 63 can recapture thermal energy from the exhaust gas 62. An additional heat exchanger 79 can be provided for heat exchange between the exhaust gas 62 and the cooling water 78. The circulation air 71 or the exhaust air 72 can be cooled with cooling water 80.

Figure 7:
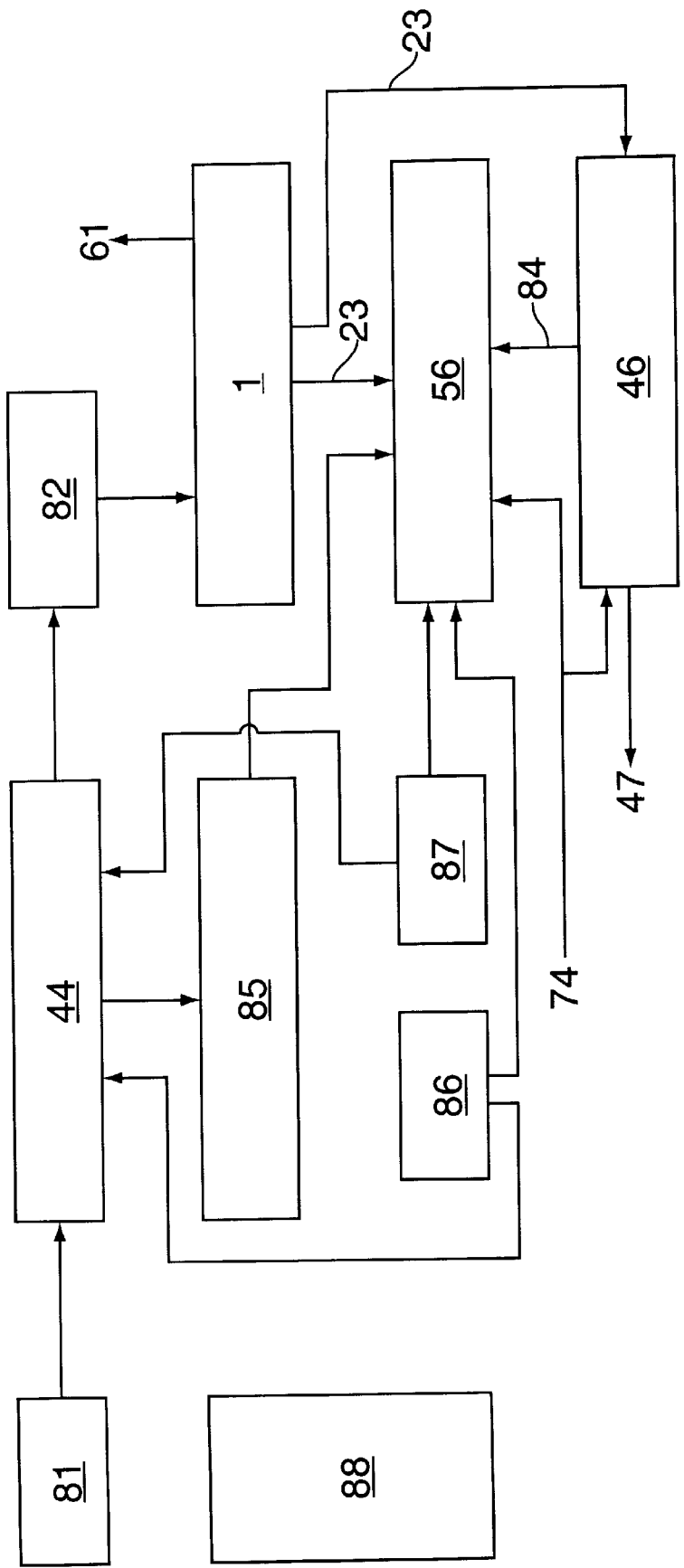
FIG. 7 shows a control scheme.

FIG. 7 illustrates a control scheme for a block heating and power station 56. 81 designates a sludge dispenser for feeding sludge into the drying conveyor 44. The dried sewage sludge is introduced by means of a dried good transfer device 82 to the gasification reactor 1. The product gas 23 can be used to supply the block heating and power station 56 or its gas motor 46. The waste heat 84 of the gas motor 46 is likewise introduced to the drying conveyor 44 or the block heating and power station 56. The gas motor 46 or the block heating and power station 56 can be supplied with a fossil fuel carrier 74 (natural gas) or product gas 23. The waste heat 85 of the drying conveyor 44 can likewise be introduced to the block heating and power station 56 or utilized for internal heat recapture of the drying conveyor 44.

A solar installation 86 can be utilized to input heat into the drying conveyor 44 or the block heating and power station 56. In addition, a heat pump 87 is provided for introducing ambient heat energy to the block heating and power station 56 or to the drying conveyor 44. Excess heat can then be used to produce warm water or for a heating installation.

A control device 88 controls and optimizes operation of the installation under ecological and/or economical aspects. The control device 88 preferentially works automatically and preferentially includes an operation data memory to store operation parameters. In this sense, operation parameters are e.g. the price of natural gas, the price of electricity or characteristic features of the heat pump. In addition, a state recognition means is provided for recognizing the operational state of the installation, for example the amount of waste heat produced, the amount of product gas 23, the gas consumption, or the operational state of the heat pump 87.

The control device 88 also includes a control system for controlling the block heating and power station and the components connected thereto including one or more of those mentioned above. In accordance with an advantageous feature, a learning memory stores experience values collected during operation of the installation and a decision making device predicts future operation by comparison of the current operational state with the experience values and controls the installation on the basis of the results of this comparison. The data can be thereby advantageously ordered and stored in the learning memory unit as a function of time of day or day of the week.

What is claimed is:

1. A down-draft gasification reactor (1) for the gasification of organic solids having high ash content and tending to form slag,
    with a solids storage chamber (4) for accepting solids and bordered from below by a grate (18), wherein the solids storage chamber (4) has an oxidation zone (12) having an intake for at least one of air and oxygen,
    with a product gas collection region (20) disposed beneath the grate (18),
    with a product gas line (22) for discharging the out-gassed product gas and ending in the product gas collection region (20), and
    with a slag-separation device disposed above the grate (18) and a discharge mechanism for transporting the separated slag out of the gasification reactor.

2. The gasification reactor (1) of claim 1, characterized in that the slag-separation device is a shut-off valve (28) directed substantially parallel to the grate (18).

3. The gasification reactor (1) of claim 2, characterized in that the shut-off valve (28) is disposed about 5 cm to 50 cm above the grate (18).

4. The gasification reactor (1) according to claim 2, characterized in that one of upwardly projecting rods and pins are disposed on a side of the shut-off valve (28) facing away from the grate (18).

5. The gasification reactor (1) according to claim 1, characterized in that the discharge mechanism comprises a removal flap (26) disposed below the slag separation device and borne in a pivotable manner.

6. The gasification reactor (1) of claim 5, characterized in that the grate (18) and the removal flap (26) are borne in a pivotable fashion to free the entire cross sectional area of the gasification reactor in the pivoted state for discharge of the separated slag.

7. The gasification reactor (1) of claim 6, characterized in that the grate (18) is rigidly connected to the removal flap (26).

8. The gasification rector (1) according to claim 1, characterized in that a bell (24) is disposed below the grate (18) and above a free end of the product gas line (22).

9. The gasification reactor (1) of claim 8, characterized in that the bell (24), together with the free end of the product gas line (22) and the removal flap (26), are disposed in a pivotable fashion.

10. The gasification reactor of claim 1, characterized in that the oxygen intake has a peripheral ring duct (32) connected to the oxidation zone (12) via a plurality of openings (38).

11. The gasification reactor (1) of claim 1, characterized in that said oxidation zone (12) has a downstream reduction zone (14).

12. The gasification reactor (1) according to claim 11, characterized in that said oxidation zone (12) has an independent intake for at least one of air and oxygen.

13. The gasification reactor (1) of claim 12, characterized in that said oxidation zone (12) has an independent ring duct (32).

14. The gasification reactor (1) according to claim 1, further comprising an ignition device introduced in the vicinity of said oxidation zone (12) to heat the solids to one of an ignition and roasting temperature.

15. The gasification reactor (1) according to claim 1, characterized in that the intake is driven by a fan (36) disposed at an air intake opening (34) of the gasification reactor.

16. The gasification reactor (1) according to claim 1, characterized in that the cross section of the oxidation zone (12) is smaller than that of neighboring zones.

17. The gasification reactor (1) of claim 16, characterized in that the oxidation zone (12) widens conically towards the neighboring zones.

18. A method for gasification of biological organic fuels, including residual or waste products such as sewage sludge (4), wood, liquid manure, characterized in that the fuel is gasified in a down-draft gasification reactor having a solids storage chamber (4) for accepting solids and bordered from below by a grate (18), wherein the solids storage chamber (4) has an oxidation zone (12) having an intake for at least one of air and oxygen, with a product gas collection region (20) disposed beneath the grate (18), with a product gas line (22) for discharging the out-gassed product gas and ending in the product gas collection region (20), and with a slag-separation device disposed above the grate (18) and a discharge mechanism for transporting the separated slag out of the gasification reactor.

19. The method according to claim 18, characterized in that the fuel is dried prior to gasification to a dried substance content of 80–99%.

20. The method according to claim 18, characterized in that the fuel is shaped into pieces (43) having a defined geometric shape.

21. The method according to claim 20, characterized in that the fuel is shaped by means of a shaping device (42) into pieces (43) with which the ratio of the square root of the surface envelope area to the cube root of the volume is adjusted to a value in excess of 1.0.

22. The method according to claim 20, characterized in that the fuel is shaped into one of sausage-, spaghetti- and noodle-shaped pieces (43).

23. The method according to claim 20, characterized in that the diameter of the pieces (43) is larger than 5 mm.

24. The method according to claim 20, characterized in that the diameter of the pieces (43) is smaller than 50 mm.

25. The method according to claim 20, characterized in that the fuel is subjected to water removal prior to shaping into pieces (43) using a mechanical water removal device (41) to a dried substance content between 15 and 45%.

26. The method according to claim 20, characterized in that the fuel is shaped in a shaping device (41) having one of a transport screw, a conveyor belt, a chain trough conveyor and a bucket conveyor for conveying fuel, a die receptive of conveyed fuel and having perforation holes and a pressing member by means of which the fuel is pressed through the perforation holes to form sausage-shaped pieces (43).

27. The method according to claim 18, characterized in that the fuel is dried by a water removal device.

28. The method according to claim 27, characterized in that the water removal device is a dryer having a drying device in which the fuel is dried with hot drying air (55).

29. The method according to claim 28, characterized in that the dryer is a drying conveyor (44) having a conveyor device (53) for transporting the fuel deposited thereon through the drying unit, wherein the conveyor transport device has perforations and a drying gas flow (55) flows through the perforations and through the fuel layer (52).

30. The method according to claim 29, characterized in that the conveyor belt transport device (53) is surrounded by a drying oven forming the drying device and having a plurality of chambers in the longitudinal direction of the conveyor belt transport mechanism (53) in which drying air (55) is guided alternately in counter current flow back and forth through the perforation openings of the conveyor belt device (53) and the fuel layer (52).

31. The method according to claim 27, characterized in that the fuel is dried such that the structured pieces (43) have a dried crust on their outer surfaces which surrounds a core of higher moisture content.

32. The method according to claim 27, characterized in that gasification reactor (1) product gas (23) is used to dry the fuel for the gasification reactor (1) in the water removal device.

33. The method according to claim 18, characterized in that the fuel is gasified in the form of a granulate (45) having an open-pored porous structure.

34. The method according to claim 18, characterized in that the fuel is gasified in the form of a granulate (45) which is piled into a stable air-permeable piled heap in the gasification reactor (1).

35. The method according to claim 18, characterized in that the fuel is piled into the gasification reactor (1) to a height between 0.5 and 4 m.

36. The method according to claim 18, characterized in that the fuel is dosed into the low-temperature carbonization zone (10) of the gasification reactor (1) while maintaining an air-permeable pile.

37. The method according to claim 18, characterized in that the fuel is mechanically subdivided in a dispensing device of the gasification reactor (1).

38. The method according to claim 18, characterized in that the product gas (23) of the gasification reactor (1) is utilized as fuel for operation of an internal combustion engine (46).

39. The method according to claim 38, characterized in that the internal combustion engine (46) serves for motor-driven production of mechanical power.

40. The method according to claim 38, characterized in that the internal combustion engine (46) is a gas-diesel motor.

41. The method according to claim 38, characterized in that motor, cooling water or exhaust gas heat (49) from the internal combustion engine (46) is used to dry the fuel for the gasification reactor (1) in a water removal device.

42. The method according to claim 18, characterized in that the fuel is dried prior to gasification to a dried substance content of between 85 and 95%.

43. The method according to claim 18, characterized in that the fuel is shaped into substantially similarly shaped pieces (43) having a defined geometric shape.

44. The method according to claim 18, characterized in that the fuel is formed into pieces (43) via a shaping device (42), and is dried by a water removal device.

45. The method according to claim 18, characterized in that the fuel is piled into the gasification reactor (1) to a height between 1.0 and 2.5 m.

46. The method according to claim 20, characterized in that the fuel is shaped by means of a shaping device (42) into pieces (43) with which the ratio of the square root of the surface envelope area to the cube root of the volume is adjusted to a value between 2.0 and 3.5.

47. The method according to claim 20, characterized in that the diameter of the pieces (43) is larger than 8 mm.

48. The method according to claim 20, characterized in that the diameter of the pieces (43) is larger than 10 mm.

49. The method according to claim 20, characterized in that the diameter of the pieces (43) is smaller than 35 mm.

50. The method according to claim 20, characterized in that the diameter of the pieces (43) is smaller than 20 mm.

51. The method according to claim 20, characterized in that the fuel is subjected to water removal prior to shaping into pieces (43) using a mechanical water removal device (41) to a dried substance content between 20 and 35%.

52. An installation for disposal of sewage sludge (40), characterized in that the installation has a down-draft gasification reactor having a solids storage chamber (4) for accepting solids and bordered from below by a grate (18), wherein the solids storage chamber (4) has an oxidation zone (12) having an intake for at least one of air and oxygen, with a product gas collection region (20) disposed beneath the grate (18), with a product gas line (22) for discharging the out-gassed product gas and ending in the product gas collection region (20), and with a slag-separation device disposed above the grate (18) and a discharge mechanism for transporting the separated slag out of the gasification reactor, wherein the reactor is operated to gasify biological organic fuels.

53. An installation for the production of gas-fuel, characterized in that the installation has a down-draft gasification reactor having a solids storage chamber (4) for accepting solids and bordered from below by a grate (18), wherein the solids storage chamber (4) has an oxidation zone (12) having an intake for one of air and oxygen, with a product gas collection region (20) disposed beneath the grate (18), with a product gas line (22) for discharging the out-gassed product gas and ending in the product gas collection region (20), and with a slag-separation device disposed above the grate (18) and a discharge mechanism for transporting the separated slag out of the gasification reactor, wherein the reactor is operated to gasify biological organic fuels.

54. A block heating and power station (56) for the production of electrical energy (47) and of thermal energy (48) though the combustion of a fuel in an internal combustion engine (46), characterized in that the block heating and power station (56) has a down-draft gasification reactor having a solids storage chamber (4) for accepting solids and bordered from below by a grate (18), wherein the solids storage chamber (4) has an oxidation zone (12) having an intake for at least one of air and oxygen, with a product gas collection region (20) disposed beneath the grate (18), with a product gas line (22) for discharging the out-gassed product gas and ending in the product gas collection region (20), and with a slag-separation device disposed above the grate (18) and a discharge mechanism for transporting the separated slag out of the gasification reactor, the product gas (23) of which is used as fuel for the internal combustion engine (46).

55. The block heating and power station (56) of claim 54, characterized in that the gasification reactor (1) is operated to gasify biological organic fuels.

56. The block heating and power station (56) of claim 55, characterized in that the block heating and power station (56) comprises a heat exchanger (76, 77) for heating a dry gas flow (55) of a water removal device using thermal energy extracted from the dry gas flow (55).

57. The block heating and power station (56) of claim 55, further comprising a heat exchanger (65) for heating a dry gas flow (55) of a water removal device using thermal energy extracted from the cooling water (78) of the internal combustion engine (46).

58. The block heating and power station (56) according to claim 55, further comprising a heat exchanger (63) for warming a dry gas flow (55) in a water removal device using thermal energy extracted from the exhaust gas (62) of the internal combustion engine (46).

59. The block heating and power station (56) according to claim 54, further comprising a burner (73) for heating a dry gas flow (55) of a water removal device using a primary energy carrier (74).

60. The block heating and power station (56) according to claim 54, further comprising a solar installation (86) for heating the drying air (55) of a water removal device.

61. The block heating and power station (56) according to claim 54, characterized by a control device (88) having an operation data memory for storage of operation parameters, a state parameter recording system for recording the operational states, a drive system for controlling the block heating and power station (56) and the components connected thereto, a learning memory for storing experience values collected during operation as well as a decision making unit to predict future operation by comparison of the current operational state parameters with the values in the learning memory and to control the block heating and power station (56) and the components connected thereto by means of the control system.

62. The block heating and power station (56) of claim 61, characterized in that experience values are recorded in the learning memory sorted according to the time of day and/or the day of the week.

63. The method according to claim 56, 57, 58, 59 or 60, wherein the water removal device comprises a drying conveyor.

* * * * *